US009213842B2

(12) United States Patent
Suen et al.

(10) Patent No.: US 9,213,842 B2
(45) Date of Patent: Dec. 15, 2015

(54) TRACING DATA BLOCK OPERATIONS (75) Inventors: Chun Hui Suen, Singapore (SG); Peter Jagadpramana, Singapore (SG); Kok Leong Ryan Ko, Singapore (SG); Bu Sung Lee, Singapore (SG)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/237,953

(22) PCT Filed: Aug. 17, 2011

(86) PCT No.: PCT/US2011/048105
§ 371 (c)(1),
(2), (4) Date: Feb. 10, 2014

(87) PCT Pub. No.: WO2013/025211
PCT Pub. Date: Feb. 21, 2013

(65) Prior Publication Data
US 2014/0208432 A1 Jul. 24, 2014

(51) Int. Cl.
G06F 21/00 (2013.01)
G06F 21/57 (2013.01)
G06F 9/455 (2006.01)
G06F 17/30 (2006.01)
G06F 11/00 (2006.01)
G06F 3/06 (2006.01)

(52) U.S. Cl.
CPC .......... *G06F 21/577* (2013.01); *G06F 9/45558* (2013.01); *G06F 11/00* (2013.01); *G06F 17/30233* (2013.01); *G06F 21/00* (2013.01); *G06F 3/0659* (2013.01); *G06F 2009/45579* (2013.01); *G06F 2009/45591* (2013.01)

(58) Field of Classification Search
CPC ....... G06F 21/577; G06F 21/00; G06F 11/00; G06F 17/30233; G06F 9/45558; G06F 3/0659; G06F 2009/45591; G06F 2009/45579
USPC ................................... 726/25, 22, 26; 705/51
See application file for complete search history.

(56) References Cited

U.S. PATENT DOCUMENTS

| 8,839,234 | B1* | 9/2014 | Voronkov ..................... 717/172 |
| 2002/0010622 | A1 | 1/2002 | Okamoto et al. |
| 2002/0059287 | A1 | 5/2002 | Karasudani et al. |
| 2008/0177755 | A1* | 7/2008 | Stern et al. .................... 707/100 |
| 2008/0270730 | A1 | 10/2008 | Lasser et al. |
| 2009/0240678 | A1* | 9/2009 | Sadovsky et al. ................. 707/5 |
| 2009/0300607 | A1 | 12/2009 | Ferris et al. |
| 2010/0228913 | A1 | 9/2010 | Czezatke et al. |
| 2011/0022883 | A1* | 1/2011 | Hansen ............................ 714/4 |
| 2011/0088027 | A1 | 4/2011 | Jelvis et al. |
| 2014/0196036 | A1* | 7/2014 | Ko et al. ........................... 718/1 |

OTHER PUBLICATIONS

International Search Report, International Application No. PCT/US2011/048105, Date of Completion: Mar. 26, 2012, Date of Mailing: Mar. 27, 2012, pp. 1-3.

(Continued)

*Primary Examiner* — Sarah Su
(74) *Attorney, Agent, or Firm* — Hewlett Packard Enterprise Patent Department (57) ABSTRACT

An apparatus and related method to track data block operations in a cloud system are provided. Attributes associated with the data block operation may be attached to each individual data block targeted by the data block operation.

18 Claims, 6 Drawing Sheets

(56) References Cited

OTHER PUBLICATIONS

Jinpeng Wei et al., "Managing Security of Virtual Machine Images in a Cloud Environment," CCSW'09, Nov. 13, 2009, pp. 91-96, ACM, Available at: <portal.acm.org/citation.cfm?id=1655008.1655021&coll=DL&dl=GUIDE&CFID=26496101&CFTOKEN=67434917>.

Rawlinson Rivera, "VMkernel's Change Block Tracking Means Faster Backups and Recovery Performance," Dec. 11, 2009, pp. 1-5, Punching Clouds, Available at: <punchingclouds.com/2009/12/11/new-vmkernel-feature-means-faster-backups-and-recovery-performance/>.

Srinivas Krishnan et al., "Trail of Bytes: Efficient Support for Forensic Analysis," CCS'10, Oct. 4-8, 2010, Chicago, Illinois, USA, pp. 50-60, Available at: <delivery.acm.org/10.1145/1870000/1866314/p50-krishnan.pdf?ip=203.8.109.15&CFID=26496101&CFTOKEN=67434917&_acm_=1306816464_f9af5a5d5464b70f8661a267e28c083b>.

European Patent Office, Communication pursuant to Rules 161(2) and 162 EPC for EP Application No. 11870999.7 dated Mar. 25, 2014 (3 pages).

European Patent Office, Communication under Rule 70(2) and 70a(2) EPC for EP Application No. 11870999.7 dated Mar. 20, 2015 (1 pages).

European Patent Office, Extended Search Report for EP Application No. 11870999.7 dated Mar. 3, 2015 (11 pages).

* cited by examiner

TRACING DATA BLOCK OPERATIONS

CROSS-REFERENCE TO RELATED APPLICATION

This application is a national stage application under 35 U.S.C. §371 of PCT/US2011/048105, filed Aug. 17, 2011.

BACKGROUND

Cloud computing has increased in popularity in recent years as more applications and data services are being managed remotely on a server rather than locally on a client. For example, when a user wishes to create a document, a suitable application running on the server displays the document created by the user on the client web browser. Memory is allocated on a client device to display application data on a screen, but calculations are carried out by one or more remote computers on a network. Moreover, files may be stored remotely on cloud servers, including files that may contain sensitive or personal data.

DETAILED DESCRIPTION

While cloud computing has been praised for promoting scalability and simplifying maintenance, it has also been criticized for potential security risks including exposing information to unlawful monitoring and theft. Aspects of the application provide techniques for tracking data block operations in a cloud system. In one aspect, a computer apparatus may execute at least one virtual machine that emulates an independent computer apparatus. In another aspect, data block operations within the computer apparatus and virtual machines therein may be intercepted. Attributes associated with the data block operations may be retrieved and appended to the targeted data block so as to imbed trace information therein. The embedded information may be later utilized for purposes of forensic analysis of the cloud network.

Figure 1:
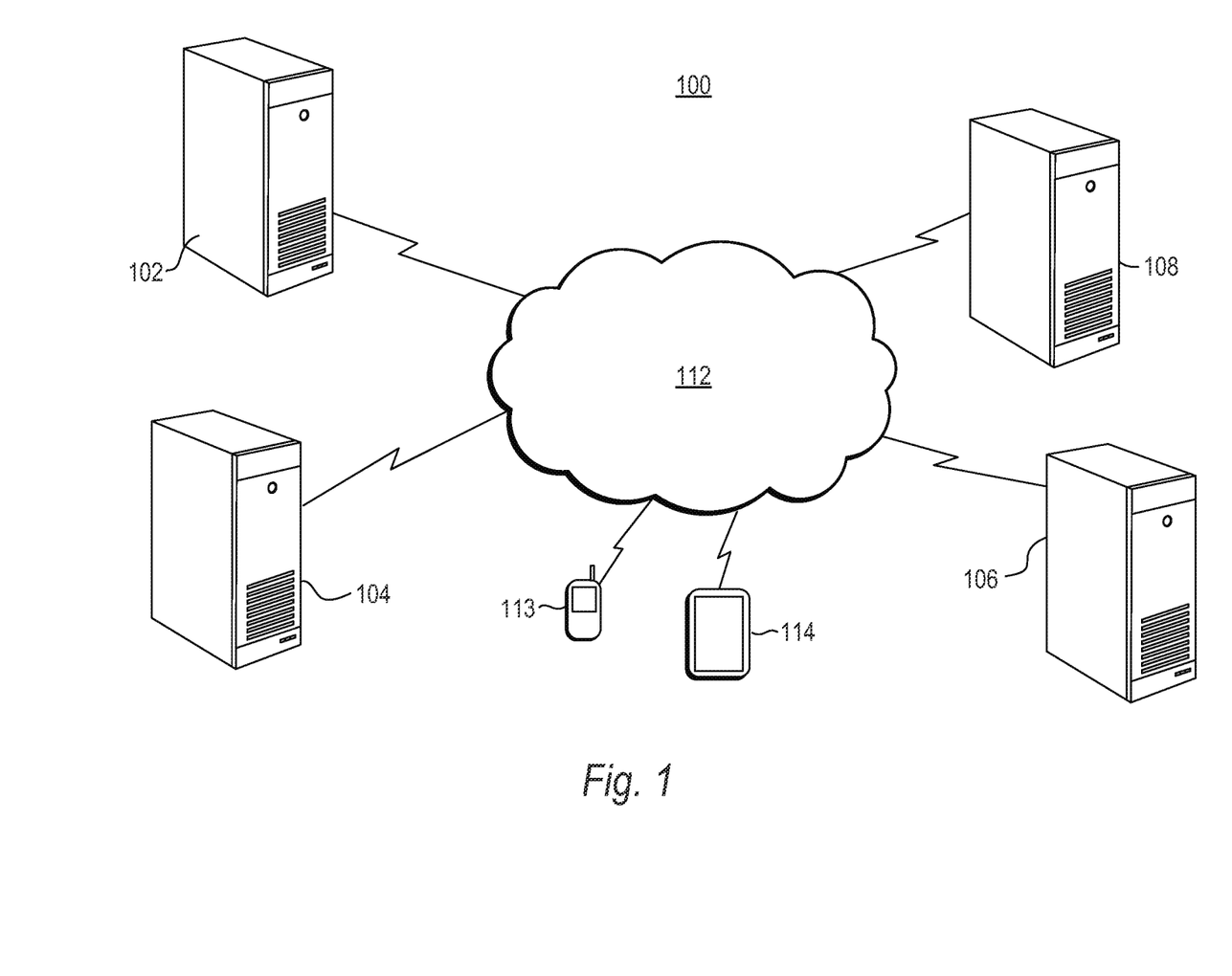
FIG. 1 illustrates an example of a cloud system in accordance with aspects of the application.

FIG. 1 presents a schematic diagram of an illustrative cloud system 100 depicting various computing devices used in a networked configuration. For example, FIG. 1 illustrates a plurality of computers 102, 104, 106 and 108. Each computer may be a node of the cloud and may comprise any device capable of processing instructions and transmitting data to and from other computers, including a laptop, a full-sized personal computer, a high-end server, or a network computer lacking local storage capability. Moreover, a node may comprise a mobile phone 113 or a mobile device 114 capable of wirelessly exchanging data with a server. Mobile device 114 may be a wireless-enabled PDA or a tablet PC.

The computers or devices disclosed in FIG. 1 may be interconnected via a network 112, which may be a local area network ("LAN"), wide area network ("WAN"), the Internet, etc. Network 112 and intervening nodes may also use various protocols including virtual private networks, local Ethernet networks, private networks using communication protocols proprietary to one or more companies, cellular and wireless networks, instant messaging, HTTP and SMTP, and various combinations of the foregoing. Although only a few computers are depicted in FIG. 1, it should be appreciated that a typical cloud system can include a large number of interconnected computers.

As noted above, each computer or device shown in FIG. 1 may be at one node of cloud system 100 and capable of directly or indirectly communicating with other computers or devices of the system. For example, computer 104 may be a cloud server capable of communicating with a client computer such that computer 104 uses network 112 to transmit information for presentation to a user. Accordingly, computer 104 may be used to generate requested information for display via, for example, a web browser executing on computer 102. Any one of the computers 102, 104, 106, and 108 may also comprise a plurality of computers, such as a load balancing network, that exchange information with different nodes of a network for the purpose of receiving, processing, and transmitting data to multiple client computers. In this instance, the client computers will typically still be at different nodes of the network than any of the computers comprising computers 102, 104, 106 and 108.

Figure 2:
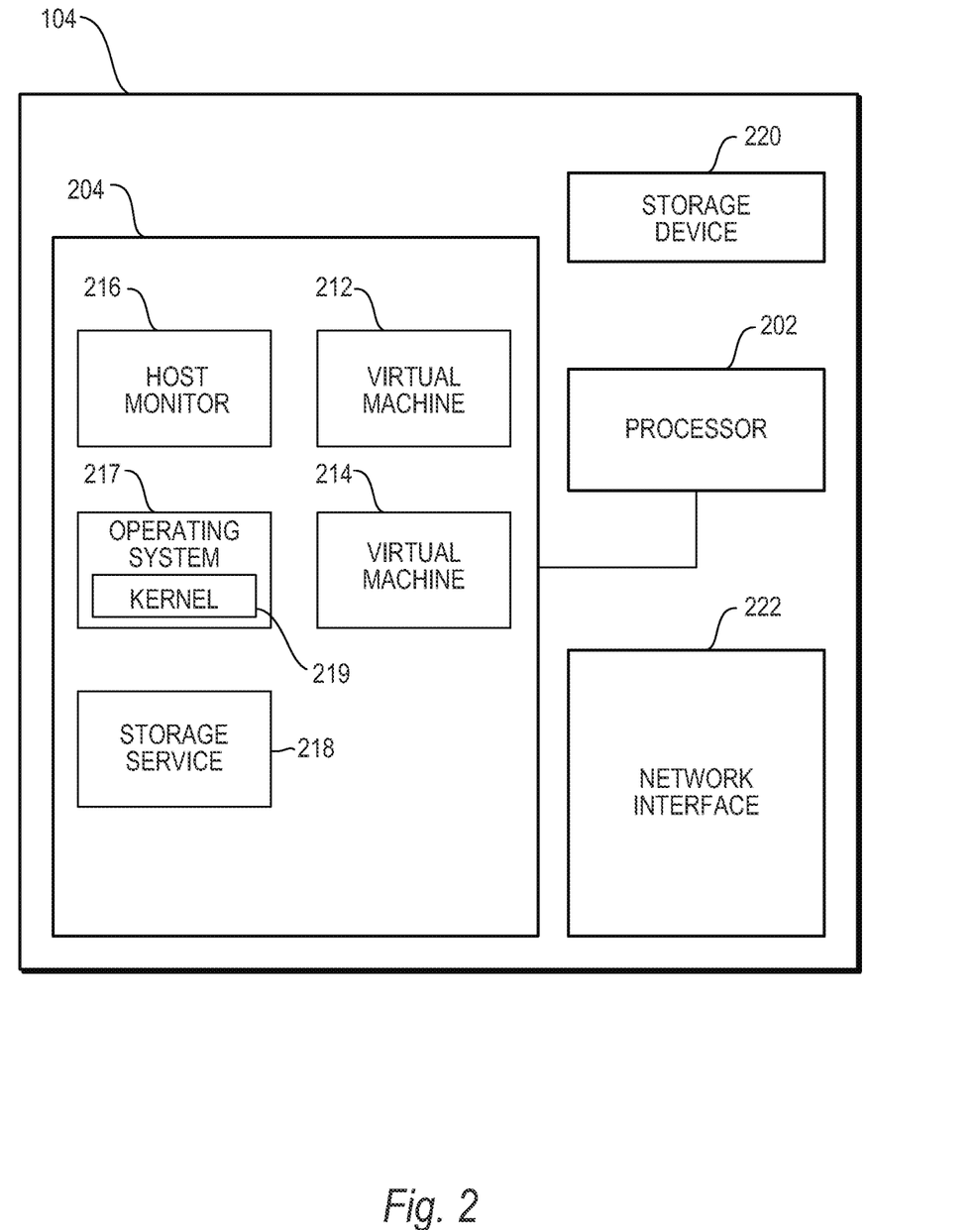
FIG. 2 is an example of a cloud server in accordance with aspects of the application.

FIG. 2 presents a close up illustration of computer 104. In the example of FIG. 2, computer 104 is a computer apparatus configured as a cloud server and may contain a processor 202, memory 204, and other components typically present in a computer. Other components may include a display (e.g., a monitor having a screen, a touch-screen, a projector, a television, a computer printer or any other electrical device that is operable to display information), and a user input (e.g., a mouse, keyboard, touch-screen or microphone). Memory 204 may store information accessible by processor 202, including instructions, which may be executed by processor 202. The memory 204 may be any type of device capable of storing information accessible by the processor, such as a hard-drive, ROM, RAM, CD-ROM, flash memories, write-capable or read-only memories. Storage device 220 may contain data that may be retrieved, manipulated, or stored by the processor and may comprise any non-volatile storage device. The processor 202 may comprise any number of well known processors or a dedicated controller for executing operations, such as an ASIC. Systems and methods may include different combinations of the foregoing, whereby different portions of the instructions and data are stored on different types of media.

Network interface 222 of computer 104 may comprise circuitry suitable for communication with other computers or devices on the cloud system 100. Network interface 222 may be an Ethernet interface that implements a standard encompassed by the Institute of Electrical and Electronic Engineers (IEEE), standard 802.3. In another example, network interface 222 may be a wireless fidelity ("Wi-Fi") interface in accordance with the IEEE 802.11 suite of standards. It is understood that other standards or protocols may be utilized, such as Bluetooth or token ring.

Although FIG. 2 functionally illustrates the processor 202 and memory 204 as being within the same block, it will be understood that the processor and memory may actually comprise multiple processors and memories that may or may not be stored within the same physical housing. For example, any one of the memories may be a hard drive or other storage media located in a server farm of a data center. Accordingly, references to a processor, computer, or memory will be understood to include references to a collection of processors or computers or memories that may or may not operate in parallel. Furthermore, storage device 220 may be at a location physically remote from, but still accessible by, the processor 202.

The instructions disclosed herein may be any set of instructions to be executed directly (such as machine code) or indirectly (such as scripts) by processor 202. For example, the instructions may be stored as computer code on a computer-readable medium. In that regard, the terms "instructions," "programs," or "modules" may be used interchangeably herein. The instructions may be stored in object code format for direct processing by the processor, or in any other computer language including scripts or collections of independent source code modules that are interpreted on demand or compiled in advance. However, it will be appreciated that examples herein can be realized in the form of software, hardware, or a combination of hardware and software. Functions, methods and routines of the instructions are explained in more detail below.

The capacity of servers on the cloud may be utilized through a technique known as virtualization. Virtualization allows a processor to emulate an independent computer apparatus in accordance with instructions, such as virtual machine instructions 212 and 214. Operations on a cloud system may occur on a physical computer apparatus or on a virtual machine (e.g., hosted by a physical computer apparatus). Each virtual machine may have its own operating system, storage device, and network resources. A separate portion of memory 204 and network interface 222 may be dedicated to each virtual machine. FIG. 2 depicts two virtual machine instructions 212 and 214 that may be used to emulate two separate computers on the same physical computer apparatus 104. While two virtual machines are depicted in FIG. 2, a cloud server may execute any number of virtual machines each of which may be dedicated to different client requests on the cloud network. For example, while the remaining portions of computer 104 may serve the requests of computer 102 of cloud system 100, virtual machine 212 may simultaneously serve the requests of another client computer, such as computer 108. Each virtual machine may serve additional client requests simultaneously and may act as an independent computer apparatus with an operating system different than that of the physical computer apparatus or of other virtual machines.

Host monitor instructions 216 may supervise the resources being employed by different processes, including virtual machines, executing in computer 104. Kernel 219 may be any set of instructions suitable for managing the resources of computer 104 and allowing other programs to utilize those resources. Kernel 219 may be a central component of operating system 217. Operating system 217 represents a collection of programs that when executed by processor 202 serve as a platform on which instructions can execute. Examples of operating systems include, but are not limited to, various versions of Microsoft's Windows® and Linux®. Storage Service 218 may be instructions that interface with kernel 219 to manage file operations executing on computer 104. While storage service 218 may execute locally in computer 104, storage service 218 may also execute on a remote computer. The file operations may be any transaction associated with a file on computer 104 (e.g., read, write, copy, rename etc.). A file operation may comprise one or more operations aimed at one or more data blocks of a particular file (i.e., block operations) in storage device 220 or memory 204. A data block is typically a sequence of bytes or bits of a nominal size.

Figure 3:
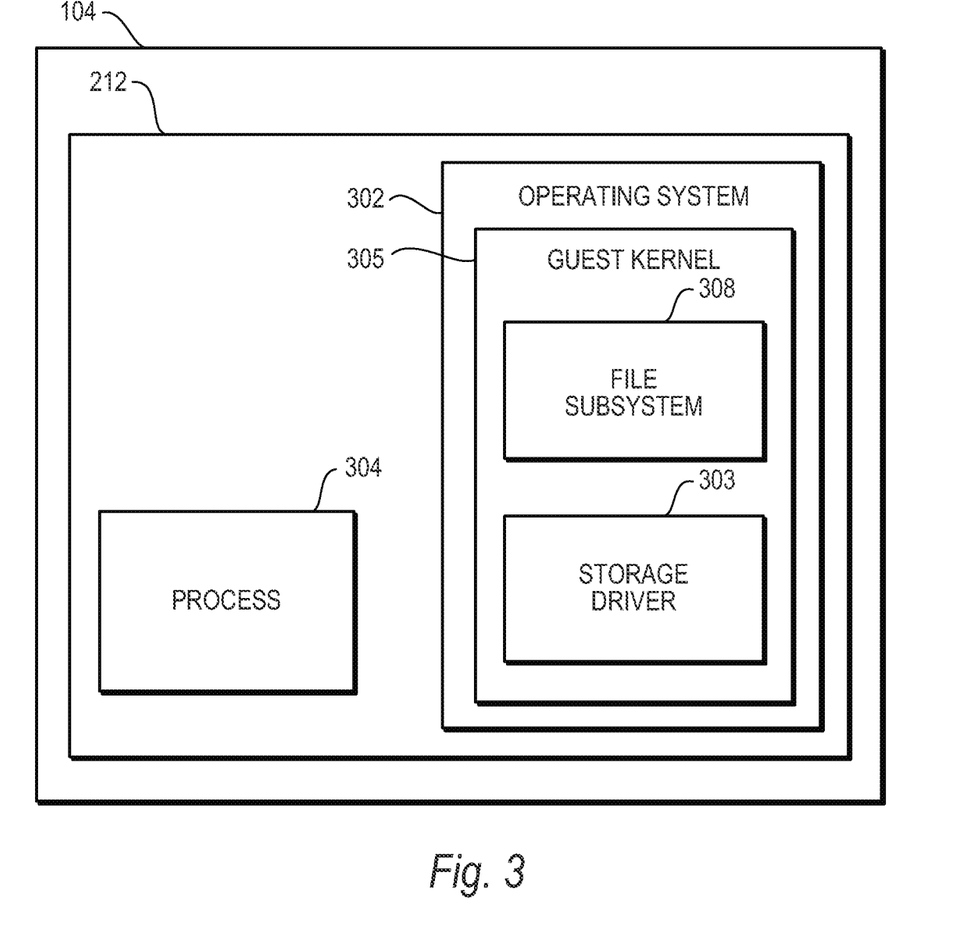
FIG. 3 is an example of a virtual machine hosted by a computer apparatus in accordance with aspects of the application.

Referring to FIG. 3, one example of a virtual machine is provided. While FIG. 3 focuses on virtual machine 212 for ease of illustration, it is understood that virtual machine 214 or any other co-existing virtual machine may include features similar to virtual machine 212 of FIG. 3. As with the physical computer apparatus 104, virtual machine 212 may have an operating system 302 and a kernel 305. File subsystem 308 may organize data in storage device 220 in a way that is accessible by virtual machine 212. The data arrangement utilized by file subsystem 308 is typically dependent on operating system 302. Examples of file subsystems include, but are not limited, to file allocation table ("FAT") system or the UNIX file system. Storage driver instructions 303 may provide an interface between storage device 220 and virtual machine 212.

Figure 4:
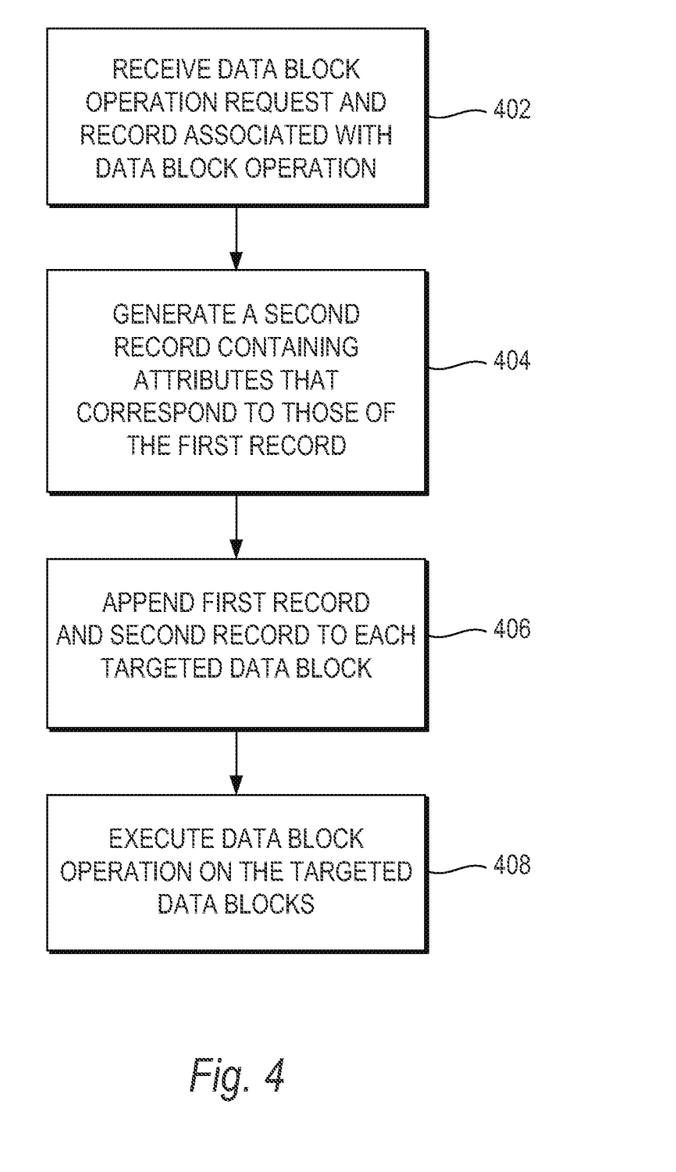
FIG. 4 is a flow diagram of an illustrative method of storing trace information associated with a block operation.
Figure 5:
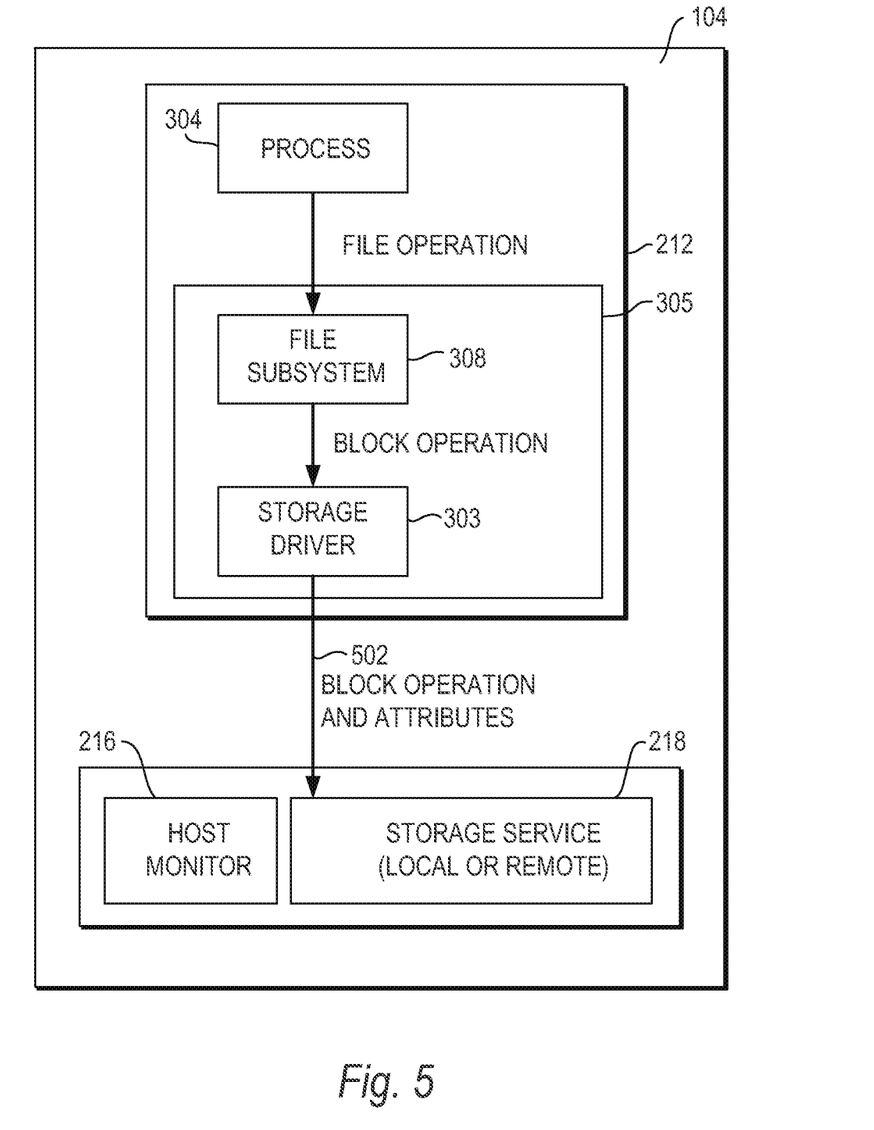
FIG. 5 is a functional diagram of a virtual machine hosted by a computer apparatus in accordance with aspects of the application.
Figure 6A:
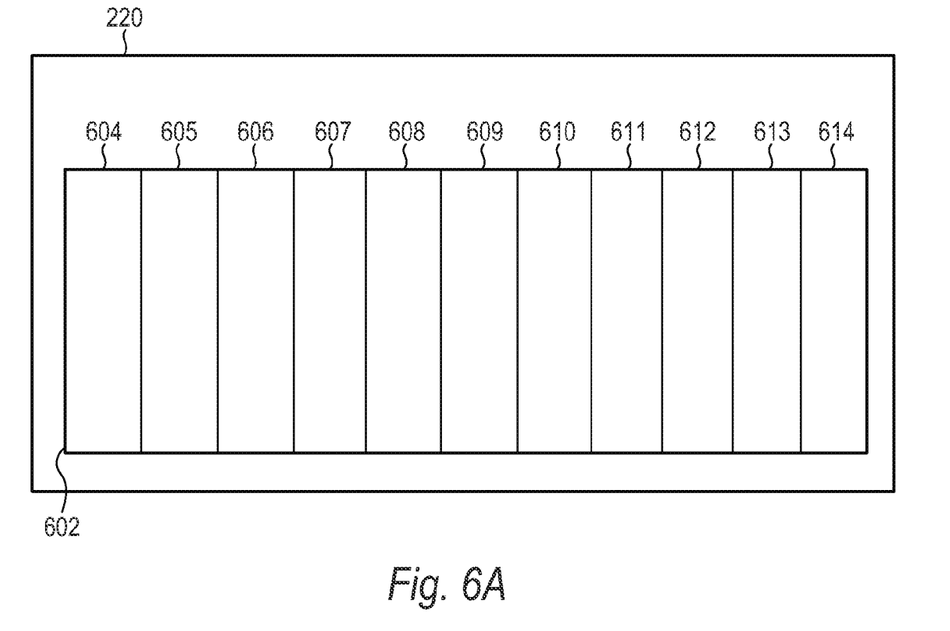
FIGS. 6A-B are schematic diagrams of examples of a file before and after execution of a block operation in accordance with aspects of the application.
Figure 6B:
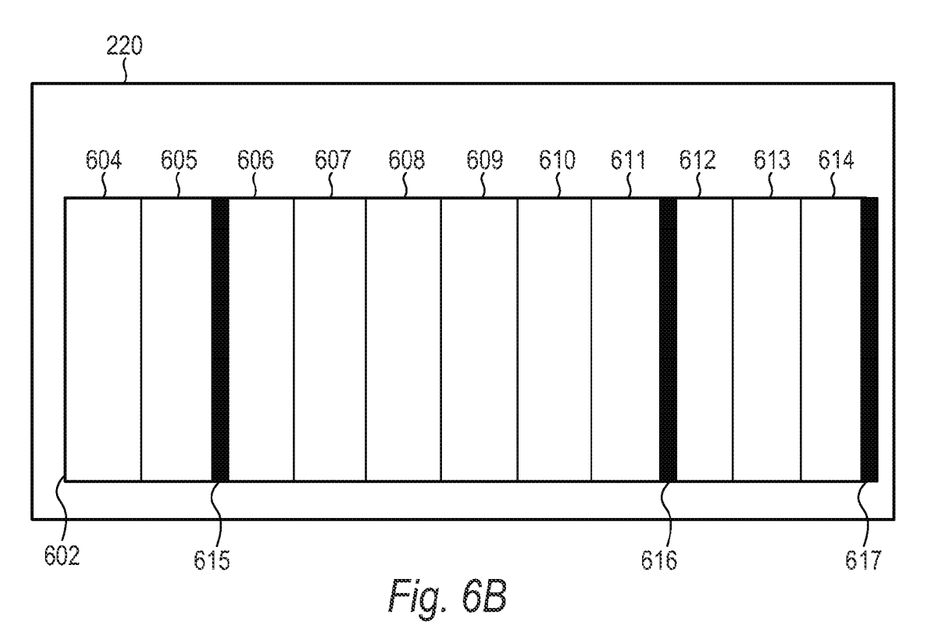

FIG. 4 illustrates a flow diagram of a process to trace data block operations on a physical and virtual computer apparatus. FIG. 5 illustrates aspects of the virtual machine and the physical computer apparatus. FIGS. 6A-6B are close up illustrations of a file before and after implementation of multiple block operations. The actions shown in FIGS. 5-6 will be discussed below with regard to the flow diagram of FIG. 4.

Referring to FIG. 4, a data block operation request and a first record may be received, as shown in block 402. The first record may comprise at least one attribute associated with the data block operation and may be generated by the same entity making the request. The requesting entity may be a virtual machine executing in computer apparatus 104, such as virtual machines 212 and 214. Alternatively, the requesting entity may be a process on a remote computer on the cloud, such as computer 108. The attributes of the record may include an identifier associated with a process making the request, such as process 304, an identifier associated with a user who initiated the request, a timestamp indicating the time in which a process started or terminated the request, resources utilized by the process making the request, or the configuration of the entity making the request (e.g., virtual or actual hardware model, CPU, network configuration, etc.). Referring back to FIG. 4, a second record may be generated, as shown in block 404. The second record may be generated by host monitor 216 of computer apparatus 104. The attributes of the second record may include host attributes that correspond to those of the first record. For example, the second record may contain resources utilized in the computer apparatus to serve the request, the host machine configuration, or an identifier associated with the host machine. The aforementioned attributes of the first and second record are merely illustrative, and it should be understood that attributes may be added or deleted.

In the example of FIG. 5, virtual machine 212 is the entity requesting the data block operation. Process 304 is shown requesting a file operation (e.g., a file create, a file write, a file deletion, a file rename, etc.) and submitting the request to file subsystem 308. File subsystem 308 may gather attributes associated with the operation. Furthermore, file subsystem 308 may convert the file operation into block operations on one or more blocks of data within the targeted file. Each block operation and its associated attributes may be forwarded to storage driver 303. In turn, storage driver 303 may transmit the same to storage service 218 executing on physical computer apparatus 104, via communication channel 502. If storage service 218 executes locally in computer 104, communication channel 502 may be, for example, a virtual serial link, such as Citrix Xen V4V or a VMWare virtual machine communication interface ("VMCI") enabled for inter-domain communication. If storage service 218 executes in a remote computer, communication channel 502 may be a link over network 112 via network interface 222.

Host monitor instructions 216 may intercept each block operation and the attributes received from virtual machine 212. Furthermore, host monitor instructions 216 may generate the second record containing corresponding host machine attributes. Referring back to FIG. 4, the first record and the second record may be concatenated or attached to each data block targeted by each block operation, as shown in block 406. The first and second record may be pre-pended or appended to each data block. Alternatively, a first pointer may be associated with the first record and a second pointer may be associated with the second record. In this example, the first pointer and the second pointer may be pre-pended or appended to each data block targeted by each block operation. Each pointer may be indicative of an address of the record's location. In this regard, the first and second record may be stored in, for example, memory 204. In block 408 of FIG. 4, each data block operation may be executed upon each targeted data block.

Host monitor 216 may forward the data blocks with the appended records to storage service 218, which may implement the operations on one or more targeted data blocks in storage device 220.

FIGS. 6A-6B illustrate blocks of data before and after implementing block operation requests. FIG. 6A shows storage device 220 containing a file 602 divided into individual data blocks 604-614 before receipt of data block operations. FIG. 6B shows file 602 after executing one or more block operations upon file 602. In the example of FIG. 6B, the data in blocks 605, 611, and 614 were updated as a result of block operations in accordance with the instructions of storage service 218. Blocks 605, 611, and 614 are shown with appended records 615, 616, and 617 respectively. Each record 615-617 may be a concatenation of the first record generated in virtual machine 212 and the second record generated in computer apparatus 104. The appended records may be retrieved by another process to display the trace information to a user investigating behavior occurring in the cloud system. In one example, the appended records may be encrypted such that only authorized users having access to a decryption key can view the trace information.

The above-described system enables the tracking of data block operations occurring on the cloud network. In this regard, users may have greater confidence that sensitive files stored in the cloud can be traced in case of theft or loss of data.

Although the application herein has been described with reference to particular examples, it is to be understood that these examples are merely illustrative of the principles and applications of the disclosure. It is therefore to be understood that numerous modifications may be made to the illustrative examples and that other arrangements may be devised without departing from the spirit and scope of the application as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. A computer apparatus comprising:
at least one hardware processor to execute machine readable instructions that cause the computer apparatus to:
receive a first record generated by an entity requesting a data block operation, the first record comprising at least one attribute associated with the data block operation;
generate a second record comprising first and second complementary attributes corresponding to the at least one attribute of the first record, the first complementary attribute including information regarding a resource to serve the data block operation, and the second complementary attribute including information regarding a machine configuration of the computer apparatus;
attach the first record and the second record to a data block, the data block being a target of the data block operation; and
execute the data block operation.

2. The computer apparatus of claim 1, wherein the at least one hardware processor is to execute machine readable instructions that cause the computer apparatus to:
execute a virtual machine, the virtual machine emulating an independent computer apparatus, the virtual machine being the entity requesting the data block operation, wherein the at least one attribute in the first record identifies a process in the virtual machine that issued a request corresponding to the data block operation.

3. The computer apparatus of claim 2, wherein the request is a request for a file operation, and wherein the virtual machine is to:
translate the request for the file operation to a request for the data block operation.

4. The computer apparatus of claim 3, wherein the at least one attribute in the first record comprises:
an identifier of the process; and
an indication of resources utilized by the process in originating the file operation.

5. The computer apparatus of claim 1, wherein the entity requesting the data block operation is a process.

6. The computer apparatus of claim 5, wherein the process executes on a remote computer apparatus.

7. The computer apparatus of claim 1, further comprising:
a non-transitory computer-readable storage medium storing instructions executable by the at least one hardware processor to perform the receiving, the generating, the attaching, and the executing.

8. The computer apparatus of claim 1, wherein the at least one processor is to execute machine readable instructions to further:
store, in a storage medium, the data block as updated by the executing of the data block operation; and
store, in the storage medium, the attached first and second records with the data block.

9. The computer apparatus of claim 8, wherein the at least one processor is to execute machine readable instructions to further:
retrieve the stored data block and the attached first and second records; and
cause display of information in the first and second records.

10. A non-transitory computer-readable storage medium storing instructions that upon execution cause a computer to:
access a first record generated by an entity requesting a data block operation, the first record comprising at least one attribute associated with the data block operation;
generate a second record comprising first and second complementary attributes corresponding to the at least one attribute of the first record, the first complementary attribute including information regarding a resource to serve the data block operation, and the second complementary attribute including information regarding a machine configuration of the computer;

associate the first record with a first pointer, the first pointer being indicative of an address of the first record;

associate the second record with a second pointer, the second pointer being indicative of an address of the second record;

attach the first pointer and the second pointer to a data block, the data block being a target of the data block operation; and execute the data block operation.

11. The non-transitory computer-readable storage medium of claim 10, wherein the instructions upon execution cause the computer to execute a virtual machine, the virtual machine emulating an independent computer, the virtual machine being the entity requesting the data block operation, wherein the at least one attribute in the first record identifies a process in the virtual machine that issued a request corresponding to the data block operation.

12. The non-transitory computer-readable storage medium of claim 11, wherein the request is a request for a file operation, and wherein the instructions upon execution cause the computer to cause the virtual machine to:

translate the request for the file operation to a request for the data block operation.

13. The non-transitory computer-readable storage medium of claim 12, wherein the at least one attribute in the first record comprises:

an identifier of the process; and an indication of resources utilized by the process in originating the file operation.

14. A method comprising:

receiving, by a computer, a request for a data block operation from a virtual machine;

receiving, by the computer, a first record comprising at least one attribute associated with the data block operation, the first record being generated by the virtual machine, and the at least one attribute identifying a process in the virtual machine;

generating, by the computer, a second record comprising a first complementary attribute including information regarding a resource to serve the data block operation, and a second complementary attribute including information regarding a machine configuration of the computer, the first and second complementary attributes corresponding to the at least one attribute of the first record;

attaching, by the computer, the first record and the second record to a data block, the data block being a target of the data block operation; and executing, by the computer, the data block operation.

15. The method of claim 14, wherein the virtual machine emulates an independent computer.

16. The method of claim 15, further comprising:

responsive to execution of the process, submitting, by the computer, a request for a file operation; and translating, by the virtual machine, the request for the file operation to the request for the data block operation.

17. The method of claim 16, wherein the at least one attribute comprises:

an identifier of the process that originated the file operation in the virtual machine; and information regarding resources utilized by the process in originating the file operation.

18. The method of claim 14, wherein the second record further comprises a third complementary attribute including an identifier of the computer.

* * * * *